United States Patent
Saboori et al.

(10) Patent No.: US 9,614,835 B2
(45) Date of Patent: Apr. 4, 2017

(54) AUTOMATIC PROVISIONING OF A DEVICE TO ACCESS AN ACCOUNT

(71) Applicant: Microsoft Technology Licensing, LLC, Redmond, WA (US)

(72) Inventors: Anooshiravan Saboori, Seattle, WA (US); Himanshu Soni, Bothell, WA (US); Peter Dawoud, Redmond, WA (US); Magnus Nystrom, Sammamish, WA (US); Jonathan David Schwartz, Sammanish, WA (US); Dayi Zhou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/733,777

(22) Filed: Jun. 8, 2015

(65) Prior Publication Data
US 2016/0359844 A1 Dec. 8, 2016

(51) Int. Cl.
*G06F 21/00* (2013.01)
*H04L 29/06* (2006.01)
(Continued)

(52) U.S. Cl.
CPC ...... *H04L 63/0823* (2013.01); *G06F 21/6245* (2013.01); *H04L 9/30* (2013.01); *H04L 63/06* (2013.01); *H04L 63/102* (2013.01)

(58) Field of Classification Search
CPC .................................................. G06F 21/6245
See application file for complete search history.

(56) References Cited

U.S. PATENT DOCUMENTS 6,510,236 B1 1/2003 Crane et al.
7,590,859 B2 9/2009 Brennan
(Continued)

FOREIGN PATENT DOCUMENTS

WO 2011031272 A1 3/2011

OTHER PUBLICATIONS

Liu et al, MACA: A privacy-preserving multi-factor cloud authentication system utilizing big data, IEEE, 2014, pp. 518-523.*
(Continued)

*Primary Examiner* — Izunna Okeke
*Assistant Examiner* — Ali Shayanfar
(74) *Attorney, Agent, or Firm* — Perkins Coie LLP

(57) ABSTRACT

A system for bootstrap provisioning of a device is provided. A vouching device is provisioned to access a bootstrap account of a bootstrap account provider and a secondary account of a secondary account provider. The bootstrap account provider stores an indication of the secondary account, and the secondary account provider stores verification data to verify a certification of the vouching device. A target device is provisioned to access the bootstrap account of the bootstrap account provider. The target device receives from the bootstrap account provider an indication that the target device is provisioned with the secondary account provider. The target device directs generation of a certification by the vouching device of target authentication data of the target device. The target device then sends the certification to the secondary account provider to effect the provisioning of the target device to access the secondary account.

18 Claims, 14 Drawing Sheets

(51) Int. Cl.
*G06F 21/62* (2013.01)
*H04L 9/30* (2006.01)

(56) References Cited

U.S. PATENT DOCUMENTS

| | | | |
|---|---|---|---|
| 7,774,824 B2 | 8/2010 | Ross | |
| 8,776,176 B2 | 7/2014 | Stebila et al. | |
| 8,806,205 B2 | 8/2014 | Metke et al. | |
| 8,806,599 B2 | 8/2014 | Roy | |
| 9,397,989 B1* | 7/2016 | Ramalingam | H04L 63/08 |
| 2005/0091539 A1 | 4/2005 | Wang et al. | |
| 2007/0097860 A1* | 5/2007 | Rys | H04L 63/10 370/229 |
| 2007/0136573 A1 | 6/2007 | Steinberg | |
| 2007/0286376 A1* | 12/2007 | Maximo | H04L 63/083 379/201.01 |
| 2008/0271122 A1* | 10/2008 | Nolan | G06F 21/32 726/4 |
| 2008/0320566 A1* | 12/2008 | Herzog | G06F 21/33 726/4 |
| 2010/0250497 A1* | 9/2010 | Redlich | F41H 13/00 707/661 |
| 2012/0066753 A1 | 3/2012 | Pan et al. | |
| 2012/0254959 A1* | 10/2012 | Schmidt | H04L 63/061 726/6 |
| 2012/0272307 A1 | 10/2012 | Buer | |
| 2013/0174241 A1* | 7/2013 | Cha | H04L 63/0815 726/7 |
| 2014/0082749 A1* | 3/2014 | Holland | G06F 21/60 726/29 |
| 2014/0096212 A1 | 4/2014 | Smith et al. | |
| 2014/0181517 A1* | 6/2014 | Alaranta | H04L 63/062 713/168 |
| 2014/0189834 A1 | 7/2014 | Metke et al. | |
| 2014/0250518 A1 | 9/2014 | Schneider | |
| 2016/0105420 A1* | 4/2016 | Engan | H04L 9/3228 455/411 |

OTHER PUBLICATIONS

"Multi Factor Authentication," Published on: Dec. 13, 2013, Available at: http://aws.amazon.com/iam/details/mfa/.

"Onelogin", Retrieved on: May 18, 2015, Available at: https://onelogin.zendesk.com/hc/en-us/articles/202123454-Adding-Multi-Factor-Authentication-.

"Multi Multi-Factor Authentication", Published on: Nov. 21, 2013, Available at: http://blog.authy.com/multi-device.

"International Search Report and Written Opinion Issued in PCT Application No. PCT/US2016/035946," Mailed Date: Sep. 5, 2016, 15 Pages.

Kerby, Fred, "Two-Factor Authentication," Retrieved from <<https://securingthehuman.sans.org/newsletters/ouch/issues/OUCH-201211_en.pdf>>, Nov. 1, 2012, 3 Pages.

* cited by examiner

AUTOMATIC PROVISIONING OF A DEVICE TO ACCESS AN ACCOUNT

BACKGROUND

A user may use a device (e.g., desktop, laptop, and smartphone) to access many different online accounts provided by various account providers. These accounts may include email accounts, financial accounts, social accounts, business accounts, e-commerce accounts, and so on. Because the information stored in these accounts may be sensitive (e.g., bank account numbers), the account providers typically require a rigorous authentication process (e.g., multi-factor authentication) so that the device can access an account. For example, to access a financial account of a financial institution, a user may access a web page of the financial institution and provide the account number. As a first factor of the authentication process, the web page may ask the user a question that the user will likely know the answer to, but others are less likely to know, such as "What is your mother's maiden name?" or "In what year did you open this account?" As the second factor for the authentication process, the financial institution may send a message with a security code to another device (e.g., smartphone) or to another account (e.g., email account) associated with the user, and the web page may prompt the user to enter the security code. If the answer to the question is correct and the security code entered matches the one sent, the user is authenticated.

After the user has been authenticated, the account provider may require the user to provide a user name and password for logging on the account. To log on to the account using the device, the account provider may again require a multi-factor authentication. For example, the user may be required to enter the user name, the password, and a new security code that is sent to another device of the user. While the use of a multi-factor authentication process to log on to an account provides a high level of security, many users find such a process cumbersome for various reasons. For example, the user may not have immediate access to the other device to which the security code is sent.

To make the logon process easier, an account provider may provision devices so that the account provider can detect that a device through which a user is logging on to an account has been previously used by that user to access the account. A common technique for provisioning a device is to store a persistent cookie provided by the account provider on the device. When the user subsequently logs on using the device, that cookie is provided to the account the provider to identify the device.

A more secure technique for provisioning may employ an asymmetric key technique as a factor. Many devices include a secure cryptoprocessor, which may be a component of the central processing unit of the device. (See ISO/IEC 11889 and the Trusted Platform Module of the Trusted Computing Group.) Such a secure cryptoprocessor of a device may generate a public/private key pair and store the private key securely within the secure cryptoprocessor. The secure cryptoprocessor can then encrypt data using the private key. The public key, which is made available outside of the cryptoprocessor, can then be used to decrypt the encrypted data. If the decrypted data matches the data that was expected, the holder of the public key knows that the data originated from the device because it was encrypted using the private key known only to that device.

Once an account provider has the public key of a device, that device is considered to be provisioned to the account. When logging on using the device, the user may be prompted to enter a user name and password. The account provider may then send to that device a security code (i.e., a challenge). A software component of the device (e.g., script of a web page) may request the secure cryptoprocessor to encrypt the security code with the private key and may send the encrypted security code to the account provider. The account provider then decrypts the encrypted data with the public key. If the decrypted data matches the security code, then the account provider knows the security code was encrypted by the provisioned device.

A user may have many devices through which the user may want to access various accounts. The user may have a smartphone, a tablet, a personal laptop, a work laptop, a personal desktop, and a work desktop. The user may want to access many email accounts, social and business networking accounts, e-commerce accounts, financial accounts, and so on from each device. To provision each device to access each account, the user may be required to perform the multi-factor authentication for each combination of device and account.

SUMMARY

A system for provisioning a target device to access an account of a account provider is provided. The account provider stores verification data of a vouching device that has been provisioned to access the account. The target device directs generation of a certification of target authentication data of the target device using certification data. The certification indicates that the vouching device certifies that the target device is authorized to access the account, and the certification is verifiable by the account provider using the verification data. To provision the target device to access the account, the target device sends the certification to the account provider so that the account provider verifies the certification using the verification data, associates the target device with the account, and authenticates, using the target authentication data, that the target device is authorized to access the account.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
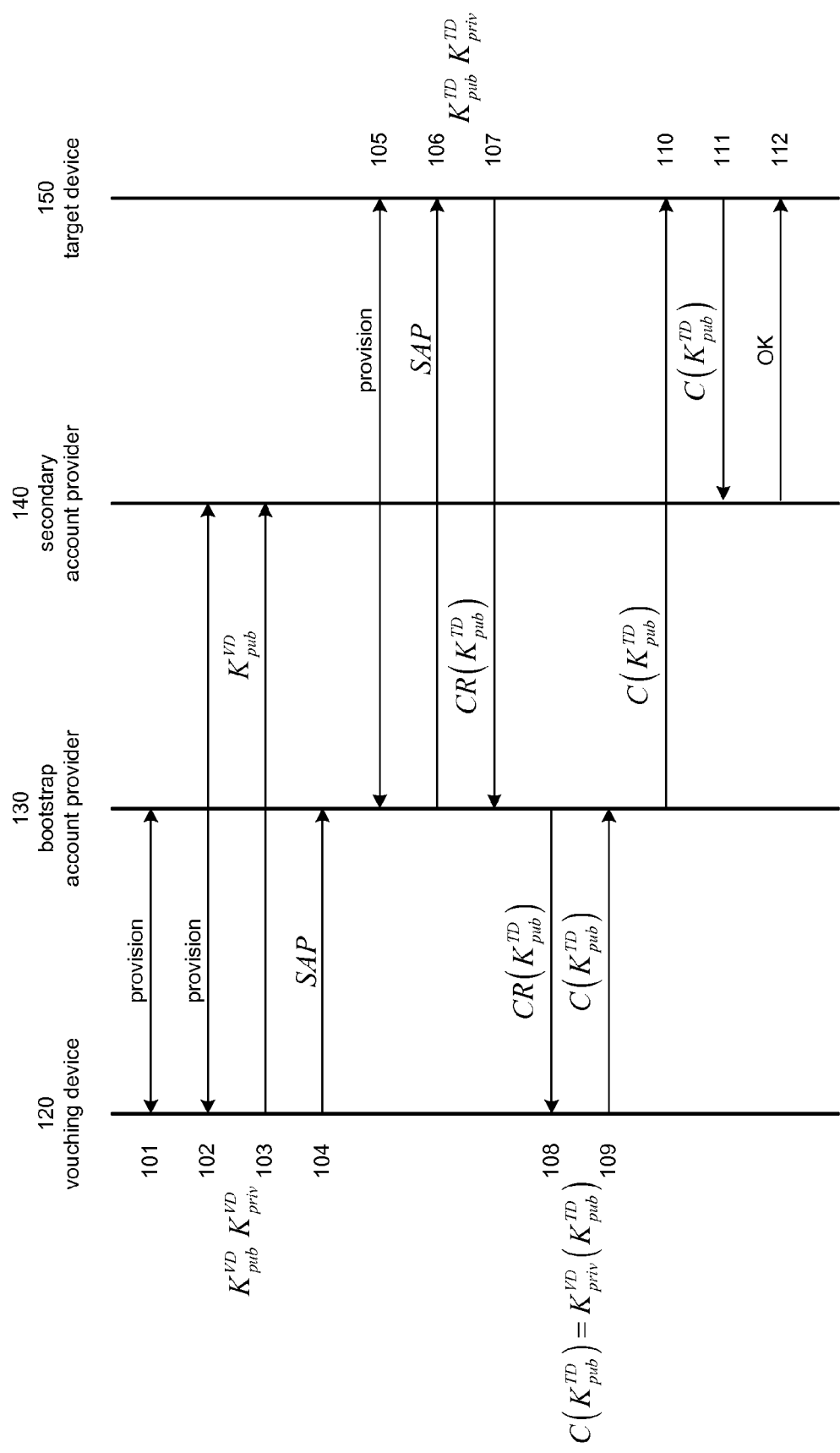
FIG. 1 is an interaction diagram that illustrates configuring for automatic provisioning and automatically provisioning a target device based on verification data provided by a vouching device in some examples.

A bootstrap provisioning system is provided for automatically provisioning a device of a user to access an account, based on another device that is already provisioned to the account vouching that the other device is authorized by the user to access the account. The automatic provisioning may be performed during initial setup of a device (e.g., as part of the "out-of-box experience") or at a later time. In some examples, the bootstrap provisioning system configures a bootstrap account of a bootstrap account provider to enable the automatic provisioning of devices of the user based on certifications of a vouching device. To configure the bootstrap account ("BA"), a vouching device ("VD") of the user is associated with the bootstrap account of a bootstrap account provider ("BAP") (e.g., an email account) and associated with a secondary account ("SA") of a secondary account provider ("SAP") (e.g., a financial institution). For example, the vouching device may be provisioned to access the accounts using a multi-factor authentication. The vouching device generates verification data and certification data (e.g., a public/private key pair or a symmetric key) and provides the verification data (e.g., the public key or the symmetric key) to the secondary account provider, which will use the verification data to verify certifications made by the vouching device using the certification data (e.g., the private key or symmetric key). The vouching device then notifies the bootstrap account provider of the secondary account to enable automatic provisioning of other devices of the user to the secondary account.

Once configured, the bootstrap provisioning system allows the automatic provisioning of a target device ("TD") of the user to the secondary account. In some examples, the target device is associated with the bootstrap account. For example, the target device may be provisioned to access the bootstrap account using a multi-factor authentication. The bootstrap account provider notifies the target device that automatic provisioning to the secondary account is enabled. The target device generates authentication data (e.g., a public key of a public/private key pair or a symmetric key) and sends to the bootstrap account provider a request to certify the authentication data. The bootstrap account provider sends the request to the vouching device. The vouching device certifies the authentication data using the certification data (e.g., by encrypting using the private key paired with the public key sent to the secondary account provider or using the symmetric key sent to the secondary account provider) and returns the certification of the authentication data to the bootstrap account provider. The bootstrap account provider then forwards the certification to the target device, which forwards the certification to the secondary account provider. The secondary account provider verifies the certification using the verification data provided by the vouching device to complete the provisioning of the target device. The certification by the vouching device indicates that the bootstrap account provider has authenticated that the target device is authorized to access the secondary account and that the authentication data can be used to authenticate the target device.

FIG. 1 is an interaction diagram that illustrates configuring for automatic provisioning and automatically provisioning a target device based on verification data provided by a vouching device in some examples. Interactions 101-104 represent the configuring for automatic provisioning. In interaction 101, a vouching device 120 is provisioned to access a bootstrap account of a bootstrap account provider 130. In interaction 102, the vouching device is also provisioned to access a secondary account of a secondary account provider 140. The vouching device may be provisioned to access the bootstrap account and the secondary account provider, for example, using multi-factor authentication. The vouching device generates a public/private key pair ("$K_{pub}^{VD}/K_{priv}^{VD}$"), and in interaction 103, forwards the public key to the secondary account provider. The secondary account provider stores the public key in association with the vouching device as verification data for use in verifying a certification by the vouching device. In interaction 104, the vouching device sends an identifier of the secondary account provider to the bootstrap account provider. Although not illustrated, the secondary account provider may also provide to the vouching device provisioning data (e.g., encrypted data using a private key of the secondary account provider) to be provided to devices that are to be automatically provisioned to access the secondary account. The provisioning data may, for example, encode instructions on how a device is to interact with the secondary account provider to automatically provision the device. The provisioning data may be a program that is executed to control the automatic provisioning. The vouching device may then provide the provisioning data to the bootstrap account provider. To enable automatic provisioning for another secondary account provider, the vouching device is provisioned to and provides the public key to the other secondary account provider and notifies the bootstrap account provider of the other secondary account provider. The bootstrap account provider stores the indication of the secondary account provider and provisioning data (if any) in association with the bootstrap account. The order in which interactions 101-104 occur may vary. For example, interaction 101 may occur after interaction 102 or after interaction 103.

Interactions 105-112 represent the automatic provisioning of a target device 150 to a secondary account. In interaction 105, the target device is provisioned to access the bootstrap account. The target device may be provisioned to access the bootstrap account prior to the completion of the configuring for automatic provisioning. In interaction 106, the bootstrap account provider provides the identifier of and/or provisioning data for the secondary account to the target device. The target device generates a public/private key pair ("$K_{pub}^{VD}/K_{priv}^{VD}$") for use in authenticating the target device to the secondary account provider. The target device may generate a different public/private key pair for each different secondary account provider. In interaction 107, the target device sends to the bootstrap account provider a request ("CR($K_{pub}^{TD}$)") to have the vouching device certify the public key. The certification by the vouching device indicates that the target device is authorized to access the secondary account. In interaction 108, the bootstrap account provider forwards the certification request to the vouching device. If the vouching device is not currently logged on to the bootstrap account, the bootstrap account provider may queue the certification request for later sending or may send the certification request to the vouching device via text message or email. When the vouching device receives the certification request, it knows that the request is from a device authorized to access the secondary account because it was sent by the bootstrap account provider that would have authenticated the target device.

The vouching device generates a certification ("C($K_{pub}^{TD}$)") by signing the public key (e.g., encrypting the public key ("$K_{priv}^{VD}(K_{pub}^{TD})$") with the private key of the vouching device and, in interaction 109, sends the certification to the bootstrap account provider. In interaction 110, the bootstrap account provider forwards the certification to the target device. In interaction 111, the target device forwards the certification to the secondary account provider. The secondary account provider verifies the signature (e.g., decrypts the public key) using the public key of the vouching device that was provided in interaction 103. In interaction 112, the secondary account provider may notify the target device that the provisioning is complete. The secondary account provider may also send a challenge to the target device to be encrypted with the private key of the target device and sent back to the secondary account provider. The secondary account provider can then decrypt the encrypted challenge to verify the provisioning of the target device.

When a target device is automatically provisioned, the target device may be allowed to automatically log in to the secondary account. For example, when the target device is booted, the operating system of the target device may receive from the user authentication information (e.g., user name and password or biometric) to log on. The operating system may compare the authentication information to an encrypted authentication stored locally to authenticate the user. Alternatively, the operating system may provide the authentication information to the bootstrap account provider to authenticate the user by automatically logging on to the bootstrap account. After the user is authenticated, the target device can automatically log on to a secondary account by sending a logon request, receiving a challenge, encrypting the challenge with the private key for the secondary account provider, and sending the encrypted challenge to the secondary account provider. The secondary account provider can then decrypt the challenge using the public key provided during automatic provisioning to complete the authentication.

Figure 2:
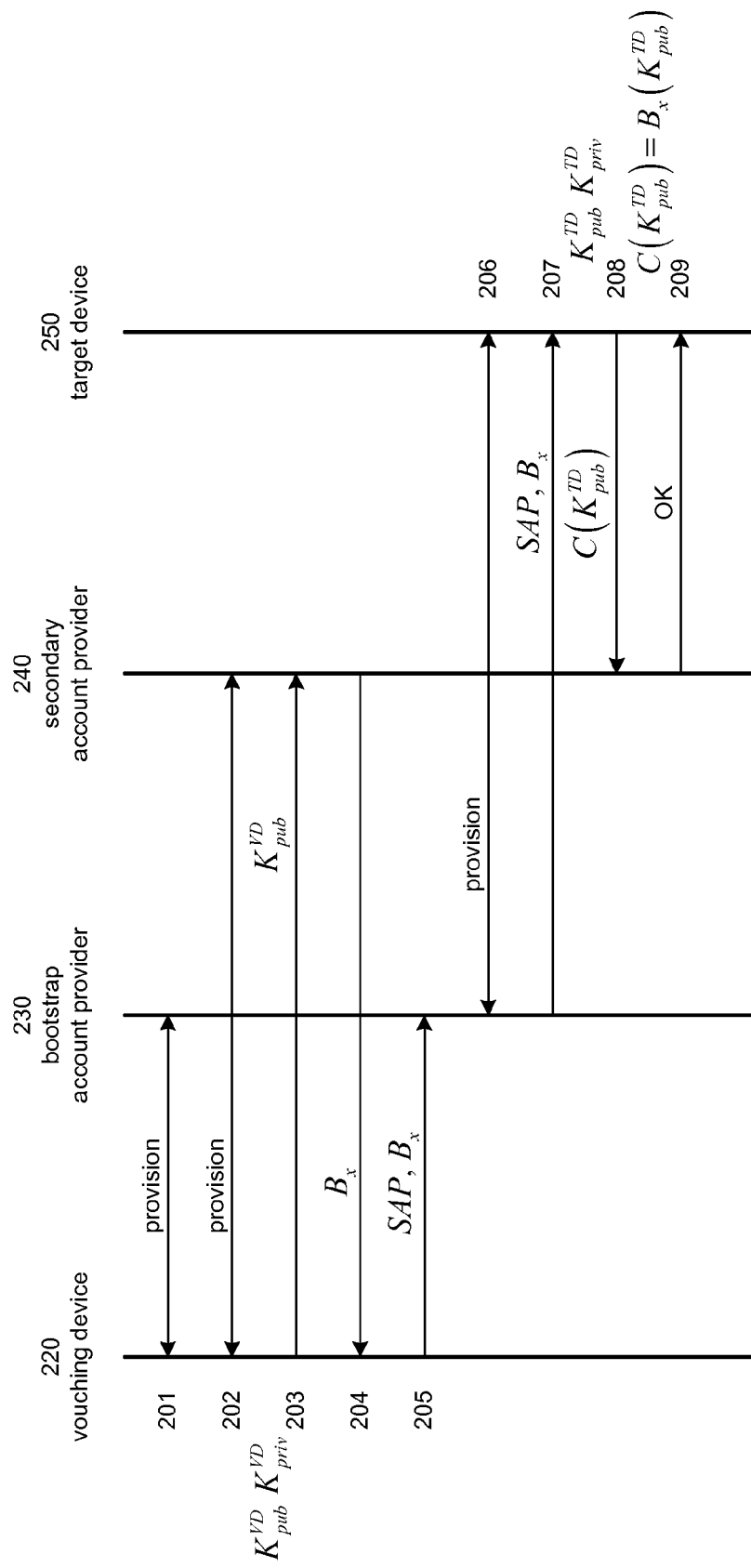
FIG. 2 is an interaction diagram that illustrates configuring for automatic provisioning and automatically provisioning a target device based on certification data provided by a secondary account provider in some examples.

FIG. 2 is an interaction diagram that illustrates configuring for automatic provisioning and automatically provisioning a target device based on certification data provided by a secondary account provider in some examples. Interactions 201-205 represent the configuring for automatic provisioning. In interaction 201, a vouching device 220 is provisioned to access a bootstrap account of a bootstrap account provider 230. In interaction 202, the vouching device is also provisioned to access a secondary account of a secondary account provider 240. The vouching device may be provisioned to access the bootstrap account and the secondary account provider using, for example, multi-factor authentication. The vouching device generates a public/private key pair and, in interaction 203, forwards the public key to the secondary account provider. The secondary account provider generates a bootstrapping key ("$B_x$") and, in interaction 204, sends the bootstrapping key to the vouching device. The bootstrapping key may be a symmetric key or a public key of a public/private key pair that is used as certification data for certifying a public key of a target device 250. In interaction 205, the vouching device sends an identifier of the secondary account provider and the bootstrapping key to the bootstrap account provider. The bootstrap account provider stores the indication of the secondary account provider, the bootstrapping key, and other provisioning data (if any) in association with the bootstrap account. The order in which interactions 201-205 occur may vary. For example, interaction 201 may occur after interaction 202 or after interactions 203 or 204.

Interactions 206-210 represent the automatic provisioning of the target device to a secondary account. In interaction 206, the target device is provisioned to access the bootstrap account. The target device may be provisioned to access the bootstrap account prior to the completion of the configuring for automatic provisioning. In interaction 207, the bootstrap account provider provides to the target device the identifier, the bootstrapping key, and any other provisioning data for the secondary account. The target device generates a public/private key pair for use in authenticating the target device to the secondary account provider. The target device may generate a different public/private key pair for each different secondary account provider. The target device encrypts the public key with the bootstrapping key ("$B_x(K_{pub}^{TD})$") as a certification ("$C(K_{pub}^{TD})$") by the vouching device and, in interaction 208, sends the encrypted public key to the secondary account provider. The secondary account provider decrypts the encrypted public key using the verification data (e.g., private key or symmetric key of the bootstrapping key). In interaction 209, the secondary account provider may notify the target device that the bootstrapping is complete. Because the vouching device provides the bootstrapping key to the bootstrap account provider for storage, the target device can be automatically provisioned without interactions with the vouching device during the automatic provisioning.

Figure 3:
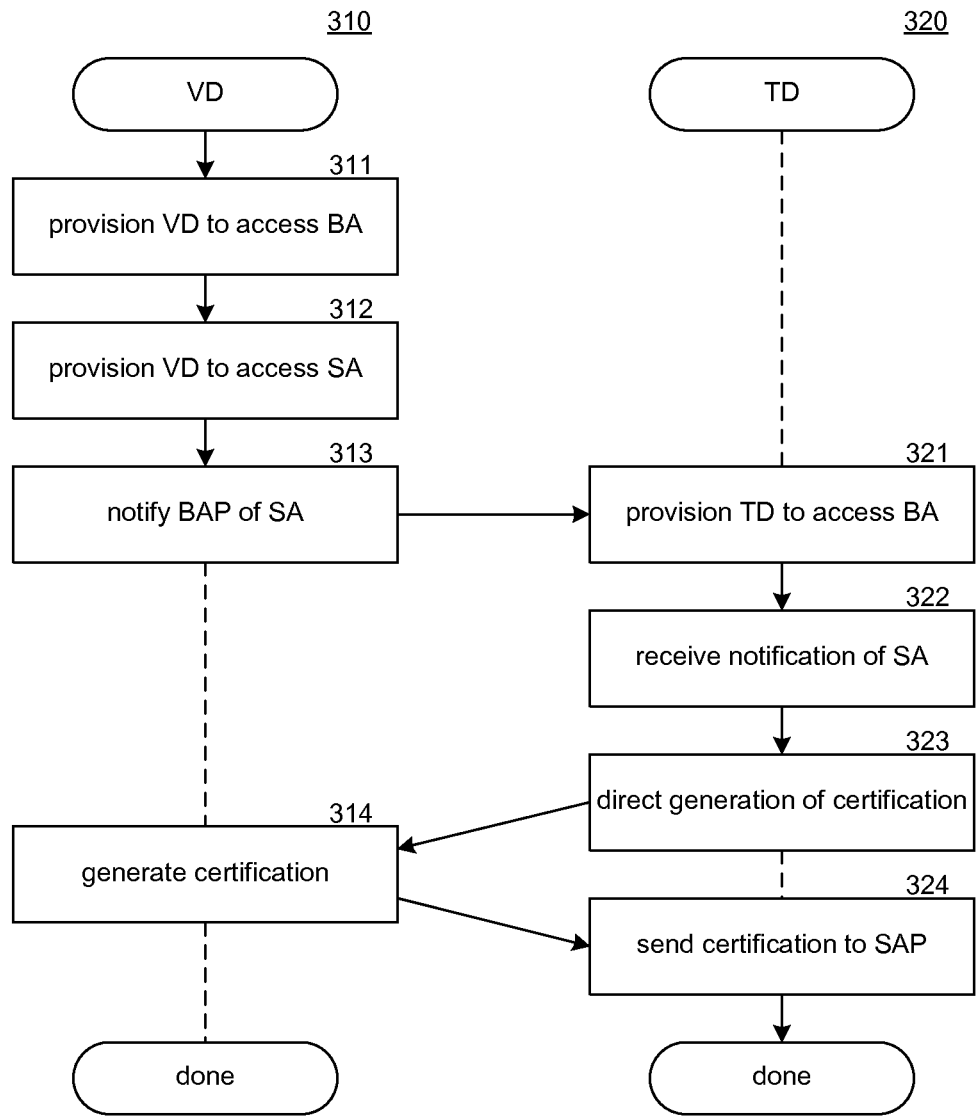
FIG. 3 provides flow diagrams that illustrate the processing of a vouching device and a target device in some examples.

FIG. 3 provides flow diagrams that illustrate the processing of a vouching device and a target device in some examples. A component 310 of the vouching device coordinates the configuring of a secondary account for automatic provisioning to a target device and provides a certification of a target device during the automatic provisioning. A component 320 of a target device coordinates the automatic provisioning of the target device to the secondary account. In block 311, the vouching device coordinates the provisioning of the vouching device with a bootstrap account of a bootstrap account provider. In block 312, the vouching device coordinates the provisioning of the vouching device to access a secondary account of a secondary account provider. In block 313, the vouching device notifies the bootstrap account provider that the secondary account is enabled or configured for automatic provisioning. In block 321, the target device coordinates the provisioning of the target device to access the bootstrap account. The identification of the bootstrap account may have been provided by a user of the target device. In block 322, the target device receives from the bootstrap account provider an indication of the secondary account. In block 323, the target device directs the generation of a certification of authentication data (e.g., a public key) of the target device by sending a certification request to the bootstrap account provider. In block 314, the vouching device receives the certification request from the bootstrap account provider, generates a certification using certification data (e.g., a private key) for the secondary account provider, and sends the certification to the bootstrap account provider for forwarding to the target device. In block 324, the target device receives the certification and forwards the certification to the secondary account provider to complete the automatic provisioning of the target device.

Figure 4:
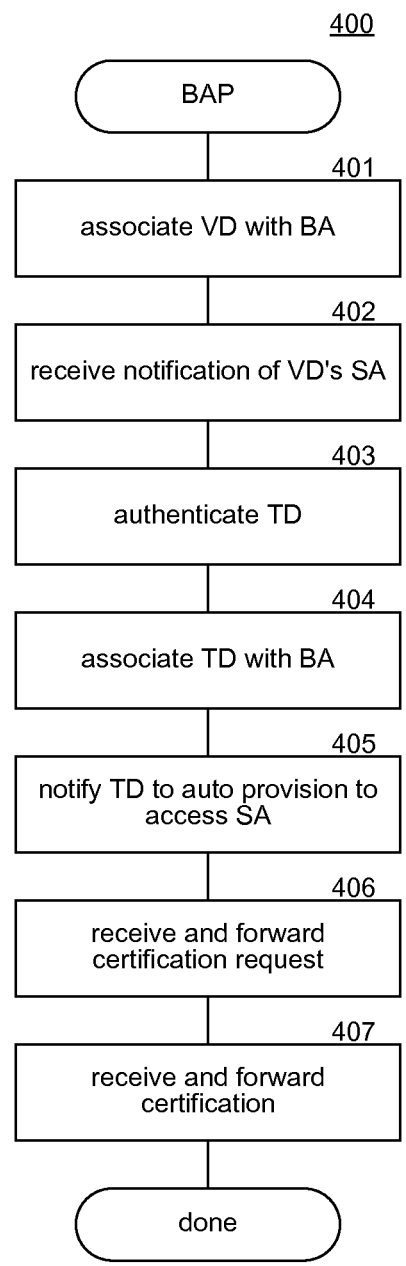
FIG. 4 is a flow diagram that illustrates processing of a bootstrap account provider in some examples.

FIG. 4 is a flow diagram that illustrates processing of a bootstrap account provider in some examples. A component 400 of the bootstrap account provider coordinates the configuring of automatic provisioning and the certification of target devices. In block 401, the component associates the vouching device with a bootstrap account, for example, while provisioning the vouching device to access the bootstrap account. In block 402, the component receives a notification of a secondary account to which the vouching device is provisioned and for which automatic provisioning is to be enabled. In block 403, the component authenticates a target device. In block 404, the component associates the authenticated target device with the bootstrap account. In block 405, the component notifies the target device to automatically provision with the secondary account. This notification can be provided at the time the target device is provisioned to access the bootstrap account or at a later time. For example, the vouching device may be provisioned to access the secondary account sometime after the target device is provisioned to access the bootstrap account. In block 406, the component receives a certification request from the target device and forwards it to the vouching device. In block 407, the component receives a certification from the vouching device and forwards it to the target device and then completes.

Figure 5:
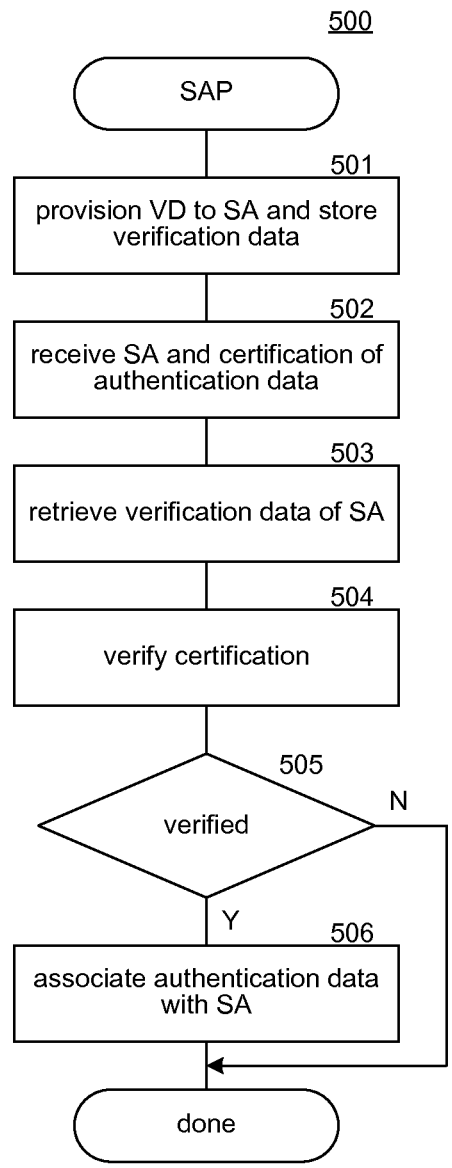
FIG. 5 is a flow diagram that illustrates processing of a secondary account provider in some examples.

FIG. 5 is a flow diagram that illustrates processing of a secondary account provider in some examples. A component 500 of the secondary account provider coordinates the provisioning of a vouching device and the automatic provisioning of a target device. In block 501, the component provisions a vouching device to a secondary account and stores verification data (e.g., a public key) provided by the vouching device. In block 502, the component receives from a target device an indication of a secondary account and a certification of authentication data for the target device. For example, the authentication data may be a public key of the target device that is certified with a private key of the vouching device. In block 503, the component retrieves the verification data of the secondary account. In block 504, the component verifies the certification (e.g., using the public key of the vouching device). In decision block 505, if the certification has been verified, then the component continues at block 506, else the component completes. In block 506, the component associates the authentication data with the secondary account so that the target device is provisioned to access the secondary account. The component then completes.

Figure 6:
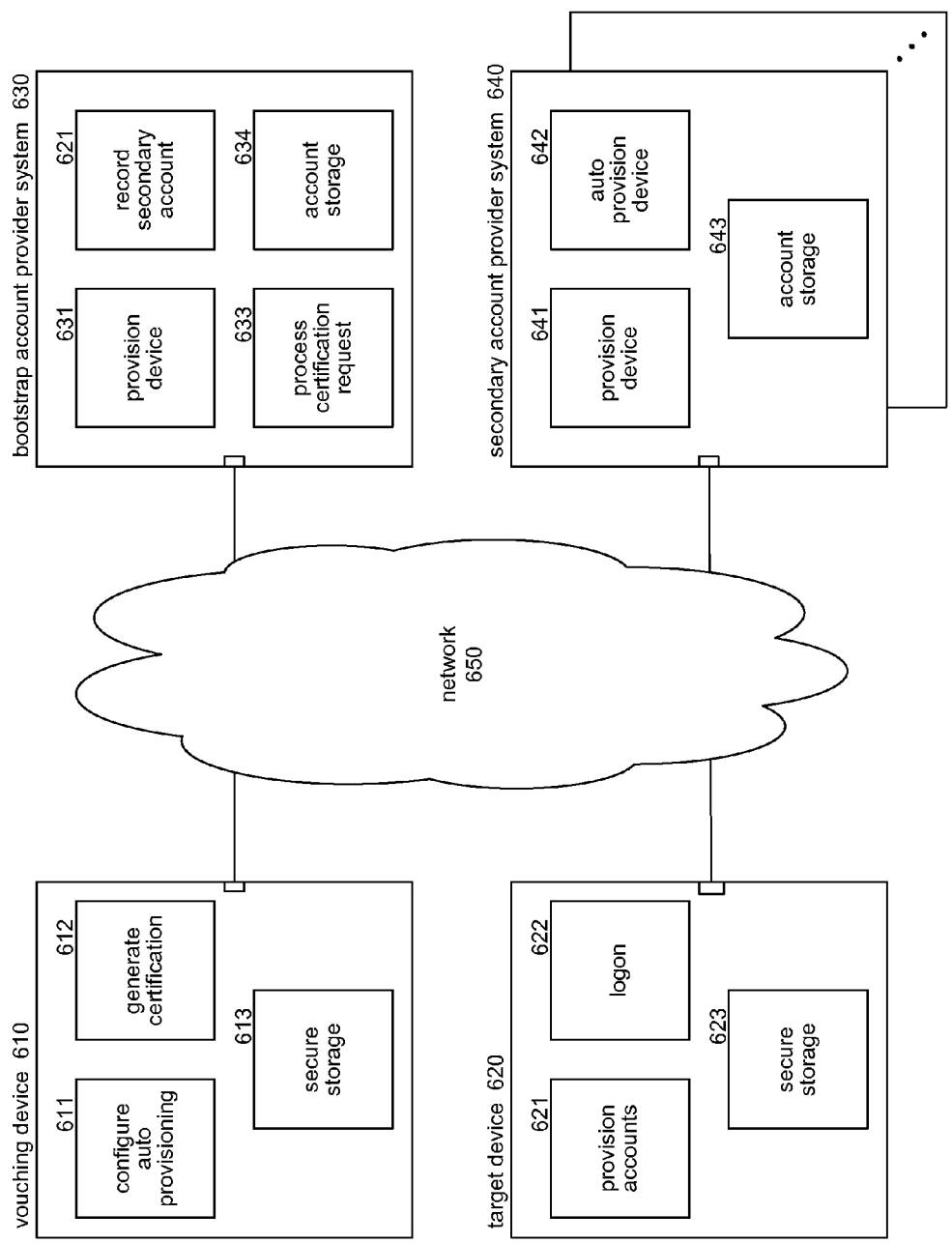
FIG. 6 is a block diagram that illustrates components of a bootstrap provisioning system in some examples.

FIG. 6 is a block diagram that illustrates components of a bootstrap provisioning system in some examples. The bootstrap provisioning system may include components of a vouching device 610, a target device 620, a bootstrap account provider system 630, and one or more secondary account provider systems 640. The vouching device, target device, bootstrap account provider system, and secondary account provider system may be interconnected via a communications network 650 such as the Internet, a cellular network, and so on.

The vouching device includes a configure auto-provisioning component 611, a generate certification component 612, and a secure storage 613. The configure auto-provisioning component controls the configuring of a bootstrap account for automatic provisioning of target devices to access secondary accounts. The generate certification component certifies a request of a target device to be automatically provisioned to access a secondary account. The secure storage securely stores verification, certification, and authentication data of the vouching device such as private keys and symmetric keys. The secure storage may be implemented as part of a secure cryptoprocessor of the vouching device.

The target device includes a provision accounts component 621, a logon component 622, and a secure storage 623. The provision accounts component controls the provisioning of the target device to a bootstrap account and the automatic provisioning of the target device to a secondary account. The logon component controls the logging on of the target device to an account. The secure storage securely stores authentication data of the target device such as private keys and symmetric keys. The secure storage may be implemented as part of a secure cryptoprocessor of the target device.

The bootstrap account provider system includes a provision device component 631, a record secondary account component 632, a process certification request component 633, and an account storage 634. The provision device component provisions devices to bootstrap accounts and provides secondary account information for automatic provisioning. The record secondary account component receives an indication of a secondary account for automatic provisioning. The process certification request component processes a certification request received from a target device during automatic provisioning. The account storage component stores information for bootstrap accounts, including public keys of provisioned devices, passwords, secondary accounts to be automatically provisioned, and so on.

The secondary account provider system includes a provision device component 641, an auto-provision device component 642, and an account storage 643. The provision device component provisions devices to bootstrap accounts. The auto-provision device component controls the automatic provisioning of a target device to a secondary account. The account storage stores information for secondary accounts, including public keys of provisioned devices, passwords, and so on.

The computing systems on which the bootstrap provisioning system of the devices and the account provider systems may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems of an account provider may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the bootstrap provisioning system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The bootstrap provisioning system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the bootstrap provisioning system may be implemented in hardware using, for example, an application-specific integrated circuit (ASIC).

Figure 7:
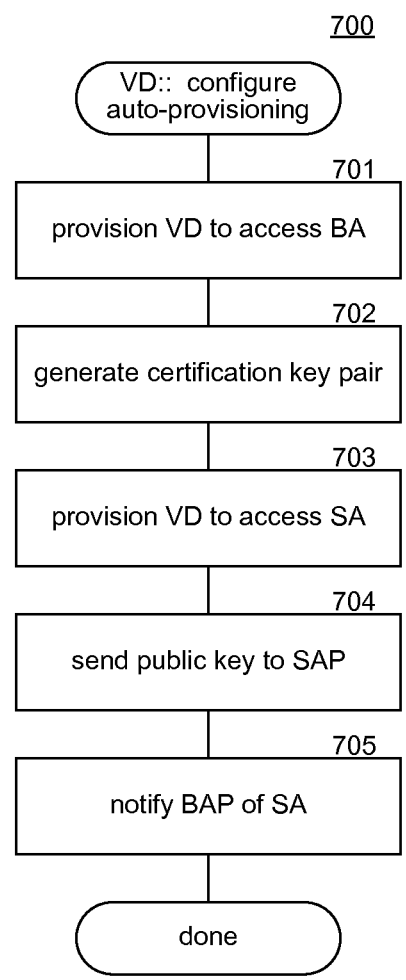
FIG. 7 is a flow diagram that illustrates the processing of a configure auto-provisioning component of a vouching device in some examples.

FIG. 7 is a flow diagram that illustrates the processing of a configure auto-provisioning component of a vouching device in some examples. A component 700 controls the provisioning of a vouching device to access a bootstrap account and a secondary account and notifies the bootstrap account provider to enable automatic provisioning for the secondary account. In block 701, the component controls the provisioning of a vouching device to access a bootstrap account. In block 702, the component generates a public/private key pair for use in certifications. In block 703, the component controls the provisioning of the vouching device to access a secondary account of a secondary account provider. In block 704, the component sends the public key to the secondary account provider for use in verifying a certification by the vouching device. In block 705, the component notifies the bootstrap account provider that the secondary account is configured for automatic provisioning. The component then completes.

Figure 8:
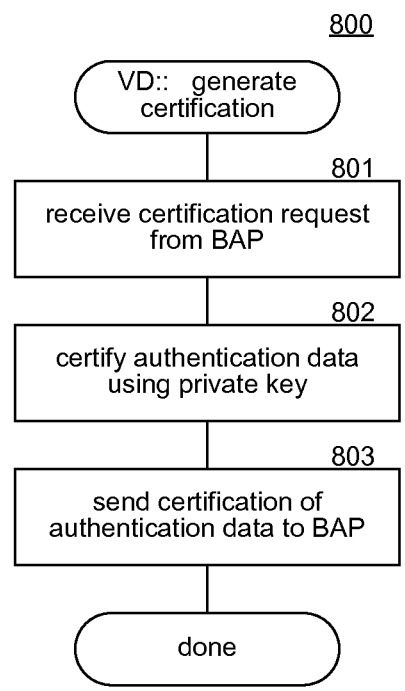
FIG. 8 is a flow diagram that illustrates the processing of a generate certification component of the vouching device in some examples.

FIG. 8 is a flow diagram that illustrates the processing of a generate certification component of the vouching device in some examples. A component 800 certifies requests from target devices to access a secondary account. In block 801, the component receives a certification request from the bootstrap account provider to certify authentication data (e.g., a public key) of a target device. In block 802, the component certifies the authentication data (e.g., encrypting with a private key of the vouching device). In block 803, the component sends a certification of the authentication data to the bootstrap account provider and then completes.

Figure 9:
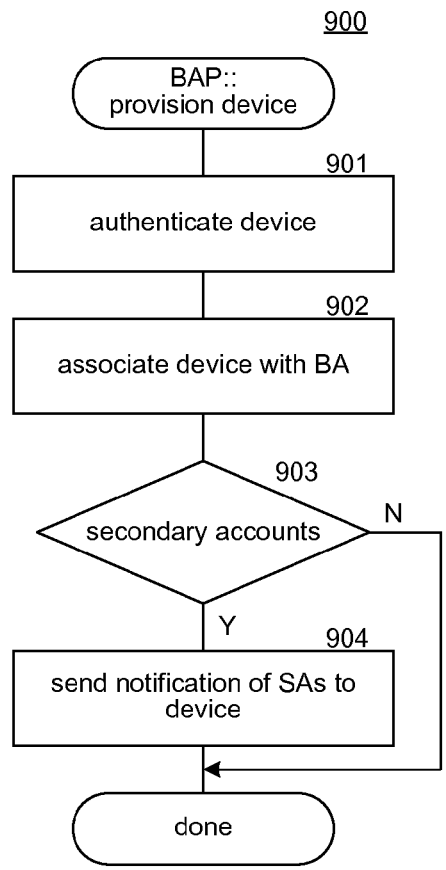
FIG. 9 is a flow diagram that illustrates the processing of a provision device component of a bootstrap account provider system in some examples.

FIG. 9 is a flow diagram that illustrates the processing of a provision device component of a bootstrap account provider system in some examples. A component 900 provisions a device and sends a notification of a secondary account if automatic provisioning is enabled for that secondary account. In block 901, the component authenticates a device. In block 902, the component associates the device with a bootstrap account. In decision block 903, if automatic provisioning of secondary accounts is enabled, then the component continues at block 904, else the component completes. In block 904, the component sends a notification of any secondary accounts to the device and then completes.

Figure 10:
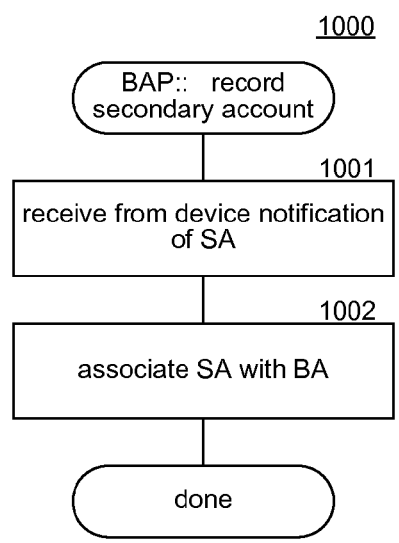
FIG. 10 is a flow diagram that illustrates the processing of a record secondary account component of a bootstrap account provider system in some examples.

FIG. 10 is a flow diagram that illustrates the processing of a record secondary account component of a bootstrap account provider system in some examples. A component 1000 records an indication that a secondary account associated with a bootstrap account has automatic provisioning enabled. In block 1001, the component receives from a vouching device a notification of a secondary account. In block 1002, the component associates the secondary account with the bootstrap account of the vouching device and then completes.

Figure 11:
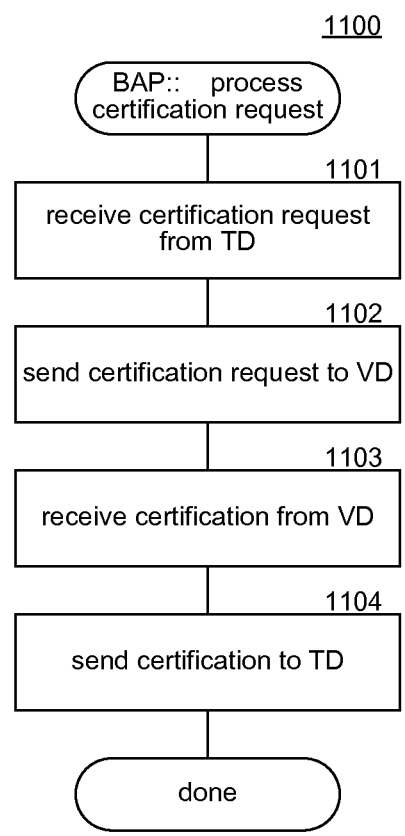
FIG. 11 is a flow diagram that illustrates the processing of a process certification request component of a bootstrap account provider system in some examples.

FIG. 11 is a flow diagram that illustrates the processing of a process certification request component of a bootstrap account provider system in some examples. A component 1100 receives and forwards certification requests and receives and forwards certifications. In block 1101, the component receives a certification request from a target device that has been provisioned to a bootstrap account. In block 1102, the component sends the certification request to the vouching device associated with the bootstrap account. In block 1103, the component receives a certification from the vouching device. In block 1104, the component sends a certification to the target device and then completes.

Figure 12:
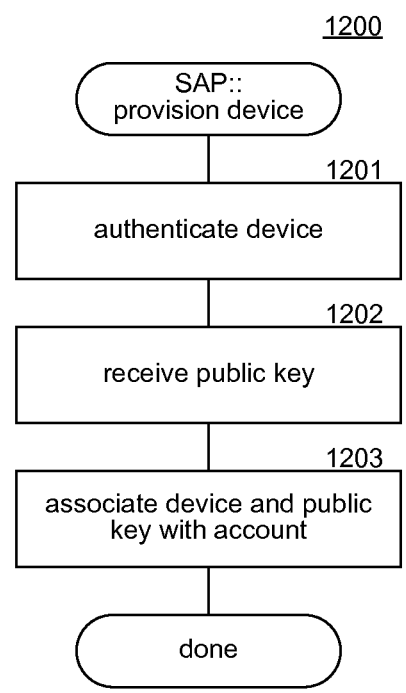
FIG. 12 is a flow diagram that illustrates the processing of a provision device component of a secondary account provider system in some examples.

FIG. 12 is a flow diagram that illustrates the processing of a provision device component of a secondary account provider system in some examples. The component 1200 controls manual provisioning of a device to a secondary account. In block 1201, the component authenticates a device. In block 1202, the component receives a public key for the device. In block 1203, the component associates the public key with the secondary account, for example, by storing the public key in the account storage of the secondary account provider system. The component then completes.

Figure 13:
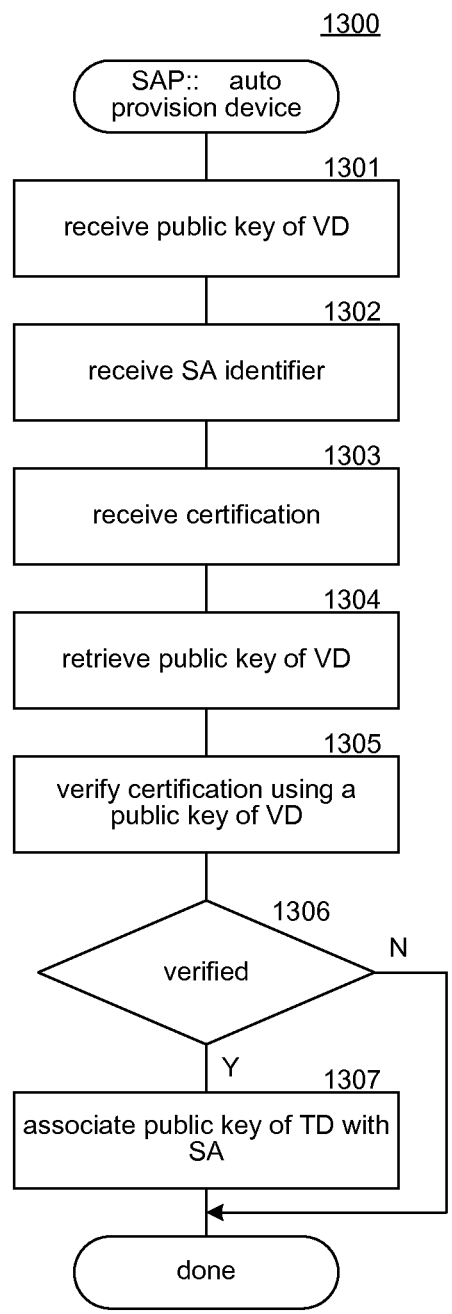
FIG. 13 is a flow diagram that illustrates the processing of an auto-provision device component of a secondary account provider system in some examples.

FIG. 13 is a flow diagram that illustrates the processing of an auto-provision device component of a secondary account provider system in some examples. A component 1300 controls the automatic provisioning of a target device to access a secondary account. In block 1301, the component receives a public key of a vouching device that is associated with a bootstrap account and stores the public key in an account storage as part of enabling automatic provisioning for a secondary account. In block 1302, the component receives an identifier of a secondary account from a target device. In block 1303, the component receives a certification of authentication data (e.g., public key) of the target device. In block 1304, the component retrieves the public key of the vouching device. In block 1305, the component verifies the certification using the public key of the vouching device. In decision block 1306, if the certification has been verified, then the component continues at block 1307, else the component completes. In block 1307, the component associates the public key of the target device with the secondary account and then completes.

Figure 14:
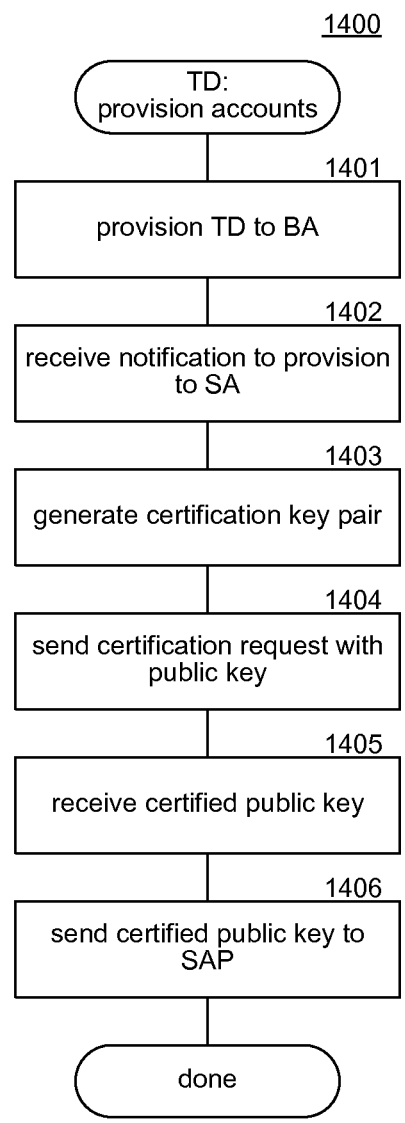
FIG. 14 is a flow diagram that illustrates the processing of a provision accounts component of a target device in some examples.

FIG. 14 is a flow diagram that illustrates the processing of a provision accounts component of a target device in some examples. The component 1400 controls the automatic provisioning of the target device to one or more secondary accounts. In block 1401, the component controls the provisioning of the target device to a bootstrap account of a bootstrap account provider. In block 1402, the component receives a notification to provision the target device to access a secondary account. In block 1403, the component generates a public/private key pair. In block 1404, the component sends a certification request to the bootstrap account provider to certify the public key. In block 1405, the component receives from the bootstrap account provider the certification of the public key. In block 1406, the component sends the certification of the public key to the secondary account provider as evidence that the vouching device has vouched for the target device. The component then completes.

Figure 15:
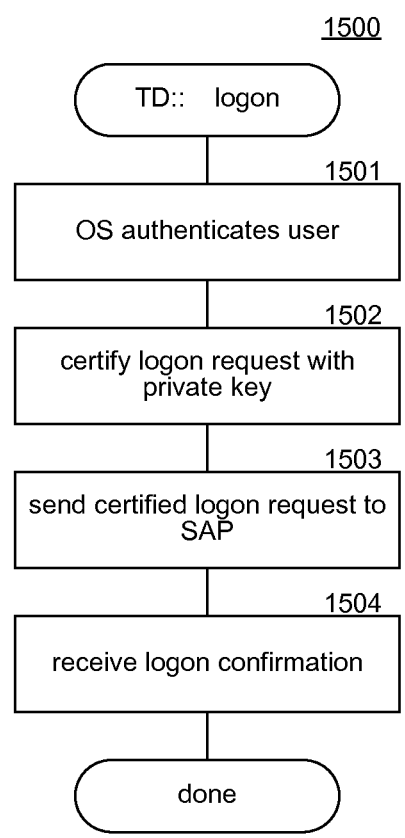
FIG. 15 is a flow diagram that illustrates the processing of a logon component of a target device in some examples.

FIG. 15 is a flow diagram that illustrates the processing of a logon component of a target device in some examples. A component 1500 controls the logging on of the target device to a secondary account to which the target device has been automatically provisioned to access. In block 1501, an operating system of the target device authenticates a user. In block 1502, the component certifies a logon request with a private key of the target device. In block 1503, the component sends the certified logon request to the secondary account provider. The secondary account provider uses the public key of the target device to verify the logon request. In block 1504, the component receives a logon confirmation and then completes.

The following sections describe various examples of aspects of the bootstrap provisioning system. An implementation of a bootstrap provisioning system may employ any combination of the examples.

Target Device

In some examples, a target device having a system for provisioning the target device to access an account of an account provider is provided. A vouching device has been provisioned to access the account, and the account provider has verification data of the vouching device. The target device comprises a storage storing instructions. The instructions direct generation of a certification of target authentication data of the target device using certification data. The certification indicates that the vouching device certifies that the target device is authorized to access the account, and the certification is verifiable by the account provider using the verification data. The instructions also provision the target device to access the account. The provisioning includes sending the certification to the account provider so that the account provider can verify the certification using the verification data, associate the target device with the account, and authenticate, using the target authentication data, that the target device is authorized to access the account. The target device further comprises a processor for executing the instructions stored in the storage. In some examples, the instructions that direct the generation of a certification include instructions that send a request for the vouching device to certify the target authentication data and receive a response that includes the certification of the target authentication data. In some examples, the certification data is provided by the account provider to the vouching device. In some examples, the certification data is a private key and the verification data is a public key of a certification public/private key pair. In some examples, the certification public/private key pair is generated by the vouching device and may be generated by a secure cryptoprocessor of the vouching device. In some examples, the certification data is provided to the vouching device by the account provider and the instructions further comprise instructions that receive the certification data that was provided to the vouching device and the instructions that direct the generation of the certification certify the target authentication data with the received certification data. In some examples, the instructions further comprise instructions that provision the target device to access a bootstrap account of a bootstrap account provider. The vouching device has been provisioned to access the bootstrap account, and the provisioning of the target device to access the bootstrap account uses a multi-factor authentication in which a factor of the multi-factor authentication is based on authentication data provided to a device already associated with the bootstrap account and the instructions further comprise instructions that direct the generation of the certification in response to receiving an indication from the bootstrap account provider that the vouching device is provisioned to access the account of the account provider.

Bootstrap Account Provider System

In some examples, a computer-readable storage medium storing computer-executable instructions for a bootstrap account provider is provided. The computer-executable instructions comprise instructions that associate with a bootstrap account a vouching device and receive a notification that the vouching device is associated with a secondary account of a secondary account provider. The instructions further in response to receiving a request of a target device to access the bootstrap account, perform a multi-factor authentication to authenticate that the target device is authorized to access the bootstrap account, associate with the bootstrap account the target device, and provide to the target device an indication that the target device is to be provisioned to access the secondary account using a certification of the vouching device that the target device is authorized to access the secondary account and that the secondary account provider can verify using verification data associated with the secondary account. In some examples, the instructions that perform the multi-factor authentication further send an authentication code to a device associated with the bootstrap account so that the authentication code can be provided to the target device and sent by the target device to the bootstrap account provider. In some examples, the notification includes provisioning data provided by the secondary account provider to the vouching device and the indication includes the provisioning data. In some examples, the certification is certified using certification data provided by the secondary account provider to the vouching device. In some examples, the certification is certified using certification data that is a private key and wherein the verification data is a public key of a certification public/private key pair and the certification public/private key pair may be generated by the vouching device.

Vouching Device and Target Device

In some examples, a method for bootstrap provisioning of a device is provided. The method comprises under control of a vouching device, provisioning the vouching device to access a bootstrap account of a bootstrap account provider, provisioning the vouching device to access a secondary account of a secondary account provider having verification data to verify a certification of the vouching device, and notifying the bootstrap account provider that the vouching device has been provisioned to access the secondary account of the secondary account provider. The method further comprises under control of a target device, provisioning the target device to access the bootstrap account of the bootstrap account provider using a multi-factor authentication, receiving from the bootstrap account provider an indication that the target device is provisioned with the secondary account provider, directing generation of a certification of target authentication data of the target device where the certification indicates that the vouching device certifies that the target device is authorized to access the secondary account and the certification is verifiable by the secondary account provider using the verification data, and sending the certification to the secondary account provider. In some examples, the directing of the generation of the certification includes sending a request for the vouching device to certify the target authentication data and receiving a response that includes the certification of the target authentication data. In some examples, the request is sent to the bootstrap account provider for forwarding to the vouching device. In some examples, the certification is certified by the vouching device using certification data provided by the secondary account provider to the vouching device and the certification data may be a symmetric key and the verification data is the symmetric key. In some examples, the certification is certified by the vouching device using certification data that is a private key and the verification data is a public key of a certification public/private key pair that is generated by the vouching device.

Secondary Account Provider System

In some examples, a system for provisioning of a target device is provided. The system comprises a storage storing computer-executable instructions that receive an indication of an account and a certification of authentication data of the target device, retrieve verification data associated with the identified account, and verify the certification of the authentication data using the verification data, and in response to verification of the certification, associate the authentication data of the target device with the account. The system further comprises a processor for executing the computer-executable instructions.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A computer-readable storage medium storing computer-executable instructions for a bootstrap account provider, the computer-executable instructions comprising instructions that:
  associate with a bootstrap account a vouching device;
  receive a notification that the vouching device is associated with a secondary account of a secondary account provider; and
  in response to receiving a request of a target device to access the bootstrap account,
    perform a multi-factor authentication to authenticate that the target device is authorized to access the bootstrap account;
    associate with the bootstrap account the target device; and
    provide to the target device an indication that the target device is to be provisioned to access the secondary account using a certification of the vouching device that the target device is authorized to access the secondary account and that the secondary account provider can verify using verification data associated with the secondary account so that after the target device is associated with the bootstrap account, the target device can be automatically provisioned to access the secondary account based on the certification.

2. The computer readable storage medium of claim 1 wherein the instructions that perform the multi-factor authentication further send an authentication code to a device associated with the bootstrap account so that the authentication code can be provided to the target device and sent by the target device to the bootstrap account provider.

3. The computer-readable storage medium of claim 1 wherein the notification includes provisioning data provided by the secondary account provider to the vouching device and the indication includes the provisioning data.

4. The computer-readable storage medium of claim 1 wherein the certification is certified using certification data provided by the secondary account provider to the vouching device.

5. The computer-readable storage medium of claim 1 wherein the certification is certified using certification data that is a private key and wherein the verification data is a public key of a certification public/private key pair.

6. The computer-readable storage medium of claim 5 wherein the certification public/private key pair was generated by the vouching device.

7. A method performed by a computing device for a bootstrap account provider, the method comprising:
  associating with a bootstrap account a vouching device;
  receiving a notification that the vouching device is associated with a secondary account of a secondary account provider; and
  in response to receiving a request of a target device to access the bootstrap account,
    performing an authentication to authenticate that the target device is authorized to access the bootstrap account;
    associating with the bootstrap account the target device; and
    providing to the target device an indication that the target device is to be provisioned to access the secondary account using a certification of the vouching device that the target device is authorized to access the secondary account and that the secondary account provider can verify using verification data associated with the secondary account
  so that after the target device is associated with the bootstrap account, the target device can be automatically provisioned to access the secondary account based on the certification.

8. The method of claim 7 wherein the authentication is a multi-factor authentication and the performing the multi-factor authentication further includes sending an authentication code to a device associated with the bootstrap account so that the authentication code can be provided to the target device and sent by the target device to the bootstrap account provider.

9. The method of claim 7 wherein the notification includes provisioning data provided by the secondary account provider to the vouching device and the indication includes the provisioning data.

10. The method of claim 7 wherein the certification is certified using certification data provided by the secondary account provider to the vouching device.

11. The method of claim 7 wherein the certification is certified using certification data that is a private key and wherein the verification data is a public key of a certification public/private key pair.

12. The method of claim 11 wherein the certification public/private key pair was generated by the vouching device.

13. A computing device comprising:
  a computer-readable storage medium storing computer-executable instructions of a bootstrap account provider, the computer-executable instructions comprising instructions that:
    associate with a bootstrap account a vouching device;

receive a notification that the vouching device is associated with a secondary account of a secondary account provider; and in response to receiving a request of a target device to access the bootstrap account, perform a multi-factor authentication to authenticate that the target device is authorized to access the bootstrap account;

associate with the bootstrap account the target device; and provide to the target device an indication that the target device is to be provisioned to access the secondary account using a certification of the vouching device that the target device is authorized to access the secondary account and that the secondary account provider can verify using verification data associated with the secondary account so that after the target device is associated with the bootstrap account, the target device can be automatically provisioned to access the secondary account based on the certification; and a processor that executes the computer-executable instructions stored in the computer-readable storage medium.

14. The computing device of claim 13 wherein the instructions that perform the multi-factor authentication further send an authentication code to a device associated with the bootstrap account so that the authentication code can be provided to the target device and sent by the target device to the bootstrap account provider.

15. The computing device of claim 13 wherein the notification includes provisioning data provided by the secondary account provider to the vouching device and the indication includes the provisioning data.

16. The computing device of claim 13 wherein the certification is certified using certification data provided by the secondary account provider to the vouching device.

17. The computing device of claim 13 wherein the certification is certified using certification data that is a private key and wherein the verification data is a public key of a certification public/private key pair.

18. The computing device of claim 17 wherein the certification public/private key pair was generated by the vouching device.

\* \* \* \* \*